(12) United States Patent
Daly et al.

(10) Patent No.: US 11,804,608 B2
(45) Date of Patent: Oct. 31, 2023

(54) FUEL CELL WITH PROTECTION FROM PRESSURE IMBALANCE

(71) Applicant: FuelCell Energy, Inc., Danbury, CT (US)

(72) Inventors: Joseph M. Daly, Bethel, CT (US); Jeffrey Brown, Danbury, CT (US); Matthew Crowley, Danbury, CT (US); Robert S. Fournier, West Hartford, CT (US); William J. Snyder, Ossining, NY (US); Fred C. Jahnke, Rye, NY (US)

(73) Assignee: FUELCELL ENERGY, INC., Danbury, CT (US)

( * ) Notice: Subject to any disclaimer, the term of this patent is extended or adjusted under 35 U.S.C. 154(b) by 235 days.

(21) Appl. No.: 17/180,152

(22) Filed: Feb. 19, 2021

(65) Prior Publication Data
US 2021/0175524 A1 Jun. 10, 2021

Related U.S. Application Data

(63) Continuation of application No. PCT/IB2019/057018, filed on Aug. 20, 2019.
(Continued)

(51) Int. Cl.
*H01M 8/04089* (2016.01)
*H01M 8/04007* (2016.01)
(Continued)

(52) U.S. Cl.
CPC ... *H01M 8/04104* (2013.01); *H01M 8/04067* (2013.01); *H01M 8/04156* (2013.01);
(Continued)

(58) Field of Classification Search
CPC ......... H01M 8/04104; H01M 8/04067; H01M 8/04156; H01M 8/04343; H01M 8/04388;
(Continued)

(56) References Cited

U.S. PATENT DOCUMENTS

| 6,861,169 B2 | 3/2005 | Hagan et al. |
| 2006/0083968 A1* | 4/2006 | Inai ............... H01M 8/04007 |
| | | 429/429 |

(Continued)

FOREIGN PATENT DOCUMENTS

| JP | S62-278764 A | 12/1987 |
| JP | S62278764 | * 12/1987 |

(Continued)

OTHER PUBLICATIONS

International Search Report and Written Opinion in PCT/IB2019/057018 dated Dec. 6, 2019.
(Continued)

*Primary Examiner* — Matthew W Van Oudenaren
(74) *Attorney, Agent, or Firm* — Foley & Lardner LLP

(57) ABSTRACT

A fuel cell system includes a fuel cell. The fuel cell includes an anode having an anode inlet configured to receive anode feed gas, and an anode outlet configured to output anode exhaust. The fuel cell further includes a cathode having a cathode inlet and a cathode outlet. The fuel cell system further includes an anode blower configured to receive the anode exhaust and output a higher-pressure anode exhaust. The fuel cell system further includes an anode blower recycle line configured to receive a portion of the higher-pressure anode exhaust downstream from the anode blower and to output the portion of the higher-pressure anode exhaust upstream from the anode blower. The fuel cell system further includes a first valve disposed in the blower recycle line, the first valve configured to open when the anode of the fuel cell is under-pressurized.

19 Claims, 9 Drawing Sheets

Related U.S. Application Data

(60) Provisional application No. 62/784,210, filed on Dec. 21, 2018, provisional application No. 62/720,400, filed on Aug. 21, 2018.

(51) Int. Cl.
*H01M 8/04119* (2016.01)
*H01M 8/0432* (2016.01)
*H01M 8/0438* (2016.01)
*H01M 8/04746* (2016.01)
*H01M 8/0668* (2016.01)
*H01M 8/0662* (2016.01)

(52) U.S. Cl.
CPC ... *H01M 8/04343* (2013.01); *H01M 8/04388* (2013.01); *H01M 8/04402* (2013.01); *H01M 8/04432* (2013.01); *H01M 8/04761* (2013.01); *H01M 8/04783* (2013.01); *H01M 8/0668* (2013.01); *H01M 8/04097* (2013.01); *H01M 8/04164* (2013.01); *H01M 8/04179* (2013.01); *H01M 8/04753* (2013.01); *H01M 8/0662* (2013.01)

(58) Field of Classification Search
CPC ......... H01M 8/04402; H01M 8/04432; H01M 8/04761; H01M 8/04783; H01M 8/0668; H01M 8/04097; H01M 8/04395; H01M 8/0662; H01M 8/04753; H01M 8/04164; H01M 8/04171; H01M 8/04179; H01M 8/04425; H01M 8/04776
See application file for complete search history.

(56) References Cited

U.S. PATENT DOCUMENTS

| | | | |
|---|---|---|---|
| 2007/0031718 A1 | 2/2007 | Fujimura et al. | |
| 2007/0184319 A1* | 8/2007 | Limbeck | H01M 8/04104 429/513 |
| 2007/0248856 A1* | 10/2007 | Ueda | H01M 8/04746 429/513 |
| 2008/0118800 A1 | 5/2008 | Devriendt et al. | |
| 2008/0318093 A1 | 12/2008 | Lee et al. | |
| 2009/0042068 A1 | 2/2009 | Weingaertner et al. | |
| 2010/0261079 A1* | 10/2010 | Kells | H01M 8/0491 429/432 |

FOREIGN PATENT DOCUMENTS

| | | | |
|---|---|---|---|
| JP | S63-241872 A | | 10/1988 |
| WO | WO2008016217 | * | 2/2008 |

OTHER PUBLICATIONS

Extended European Search Report on EP 19851764.1 dated May 6, 2022 (7 pages).

* cited by examiner

FUEL CELL WITH PROTECTION FROM PRESSURE IMBALANCE

CROSS-REFERENCE TO RELATED APPLICATIONS

The present application is a Continuation of International Application No. PCT/IB2019/057018, filed Aug. 20, 2019, which claims priority to and the benefit of U.S. Provisional Patent Application No. 62/720,400, filed Aug. 21, 2018, and U.S. Provisional Patent Application No. 62/784,210, filed Dec. 21, 2018. The entire disclosures of International Application No. PCT/IB2019/057018, U.S. Provisional Patent Application No. 62/720,400, and U.S. Provisional Patent Application No. 62/784,210 are incorporated herein by reference.

BACKGROUND

The present application relates generally to the field of fuel cell systems, and more specifically, to systems with protection from pressure imbalance between the anode and cathode of the fuel cell.

In conventional fuel cell systems, when an anode exhaust processing system is included, an anode blower is generally incorporated to provide pressure balance from the anode to the cathode of the fuel cell. Pressure balance means the anode pressure is nearly the same as the cathode pressure, to within a few inches water column difference. During upsets in the operation of the system, for example when the fuel cell power output rapidly increases or decreases, a pressure imbalance results from an instantaneous reduction or increase in the volumetric flow rate of the fuel cell anode exhaust. Moreover, the anode blower generally takes several seconds to reduce speed or increase speed to compensate for this increase or reduction in the anode exhaust flow rate. During this delay, the flow rate of anode exhaust supplied to the anode blower is either insufficient (in the power reduction case) or too great (in the power increase case), relative to the flow rate being drawn into the anode blower. The sudden difference in flow rates results in a decrease or increase in the anode pressure relative to pressure in the cathode (i.e., anode under-pressurization or anode over-pressurization). The anode under-pressurization or over-pressurization may be severe enough to cause damage to the fuel cell, typically by damaging the fuel cell manifold and/or the fuel cell manifold seals.

In some fuel cell manifold designs, anode under-pressurization greater than (i.e., more negative than) −7 inches of water-column pressure (iwc), measured as the difference in pressure between the anode and the cathode, is considered potentially damaging to the fuel cell. Under-pressurization greater than −10 iwc is considered likely to cause fuel cell damage. Anode under-pressurization greater than −15 iwc is considered very likely to cause fuel cell damage. Fuel cell damage may be limited to damage of the fuel cell manifolds and the manifold seals. In the case of anode under-pressurization, more severe damage may result from the manifold collapsing, causing mechanical damage to additional components of the fuel cell (e.g., the internal fuel delivery system) or may damage the cells in other ways (e.g., electrical short to the cells). Repairing damage due to under-pressurization may be very costly, sometimes exceeding the value of the fuel cell itself.

Similar to under-pressurization, anode over-pressurization may damage the fuel cell system. Over-pressurization may occur when the fuel cell power output suddenly increases, causing a corresponding increase in the anode exhaust volumetric flow rate that outpaces the compensating speed increase in the anode blower. Other causes of anode over-pressurization are blower failure or failure of a valve in the anode exhaust line while the fuel cell is in steady operation. Additionally, anode over-pressurization may occur while the fuel cell power plant is shut down and the fuel cell anode is blocked in for controlled purge through a vent line if there are erroneously high flow rates into the fuel cell anode (e.g., excessively high nitrogen purge).

Anode over-pressurization greater than (more positive than) +7 iwc is considered potentially damaging to the fuel cell manifold gasket. Over-pressurization greater than +10 iwc is considered likely to cause damage, and over-pressurization greater than +15 iwc is considered very likely to cause damage. Damage from over-pressurization typically includes blowing out the manifold gasket material.

It may be advantageous to limit or completely avoid anode under-pressurization in the fuel cell system with a recycle line around the anode blower and completely avoid anode over-pressurization by venting the anode exhaust through a back pressure control system, such as a level-adjusting water seal or a differential pressure relief valve. By preventing or limiting both anode under-pressurization and anode over-pressurization, fuel cell damage and subsequent costly repairs may be avoided.

SUMMARY

One embodiment relates to a fuel cell system, including a fuel cell. The fuel cell includes an anode having an anode inlet configured to receive anode feed gas, and an anode outlet configured to output anode exhaust. The fuel cell further includes a cathode having a cathode inlet and a cathode outlet. The fuel cell system further includes an anode blower configured to receive the anode exhaust and output a higher-pressure anode exhaust. The fuel cell system further includes a blower recycle line configured to receive a portion of the higher-pressure anode exhaust downstream from the anode blower and to output the portion of the higher-pressure anode exhaust upstream from the anode blower, preferably upstream of the anode exhaust processing equipment. The fuel cell system further includes a first valve disposed in the blower recycle line, the first valve configured to open when the anode of the fuel cell is under-pressurized, thereby protecting the fuel cell system against anode over- and under-pressurization.

One embodiment relates to a fuel cell system, including a fuel cell. The fuel cell includes an anode having an anode inlet configured to receive anode feed gas, and an anode outlet configured to output anode exhaust. The fuel cell further includes a cathode having a cathode inlet and a cathode outlet. The fuel cell system further includes an anode blower configured to receive the anode exhaust and output a higher-pressure anode exhaust. The fuel cell system further includes a blower recycle line configured to receive a portion of the higher-pressure anode exhaust downstream from the anode blower and to output the portion of the higher-pressure anode exhaust upstream from the anode blower, preferably upstream of the anode exhaust processing equipment. The fuel cell system further includes a control system and a first valve disposed in the blower recycle line, the first valve configured to open when the first valve receives a signal from the control system to avoid anode under-pressurization.

One embodiment relates to a fuel cell system, including a fuel cell. The fuel cell includes an anode having an anode inlet configured to receive anode feed gas, and an anode outlet configured to output anode exhaust. The fuel cell further includes a cathode having a cathode inlet and a cathode outlet. The fuel cell system further includes an anode blower configured to receive the anode exhaust and output a higher-pressure anode exhaust. The fuel cell system further includes a blower recycle line configured to receive a portion of the higher-pressure anode exhaust downstream from the anode blower and to output the portion of the higher-pressure anode exhaust upstream from the anode blower. The fuel cell system further includes a first valve disposed in the blower recycle line, the first valve configured to open when the anode of the fuel cell is under-pressurized, thereby protecting the fuel cell against anode under-pressurization. The fuel cell system may further include a control system configured to send a signal to the first valve, causing it to open when the fuel cell anode is under-pressurized. The system further includes a level-adjusting water seal which limits the fuel cell anode pressure by having its water level adjusted by the cathode inlet pressure, thereby protecting the fuel cell system from anode over-pressurization by venting excess anode exhaust gas to atmosphere while maintaining the desired anode pressure during upsets when the blower cannot maintain the desired anode-to-cathode pressure differential.

Another embodiment relates to a fuel cell system, including a fuel cell. The fuel cell includes an anode having an anode inlet configured to receive anode feed gas, and an anode outlet configured to output anode exhaust. The fuel cell further includes a cathode having a cathode inlet and a cathode outlet. The fuel cell system further includes an anode blower configured to receive the anode exhaust and output a higher-pressure anode exhaust. The fuel cell system further includes a blower recycle line configured to receive a portion of the higher-pressure anode exhaust downstream from the anode blower and to output the portion of the higher-pressure anode exhaust upstream from the anode blower. The fuel cell system further includes a first valve disposed in the blower recycle line, the first valve configured to open when the anode of the fuel cell is under-pressurized, thereby protecting the fuel cell against anode under-pressurization. The fuel cell system may further include a control system configured to send a signal to the first valve, causing it to open when the fuel cell anode is under-pressurized. The system further includes a differential pressure regulator to maintain the anode outlet pressure relative to the cathode inlet pressure by venting excess anode exhaust gas to atmosphere while maintaining the desired anode pressure during upsets when the blower cannot maintain the desired anode-to-cathode pressure differential, thereby protecting the fuel cell against anode over-pressurization.

Another embodiment relates to a method of controlling pressure in a fuel cell system, including receiving anode feed gas at an anode inlet, receiving cathode feed gas at a cathode inlet, and outputting anode exhaust from an anode outlet. The method further includes measuring a first pressure at one of the anode inlet or the anode outlet, measuring a second pressure at the cathode inlet, and determining a first pressure differential between the first pressure and the second pressure. The method further includes receiving the anode exhaust at a blower inlet and controlling a first pressure differential by means of a blower speed controller. The method further includes outputting the anode exhaust from a blower outlet at a higher pressure than at the anode blower inlet, and receiving at least a portion of the higher-pressure anode exhaust at a blower recycle line configured to output the higher-pressure anode exhaust upstream from the blower inlet.

Another aspect of the fuel cell system relates to an anode exhaust line configured to receive the anode exhaust from the anode, a vessel partially filled with water, a water seal downpipe extending away from the anode exhaust line and with at least a portion extending generally downward into the vessel, such that a water seal downpipe outlet is disposed in the water, and a vent defined in the vessel above a waterline, the vent configured to output anode exhaust.

Another aspect of the fuel cell system relates to a water level in the vessel being defined relative to a vertical position of the water seal downpipe outlet. The water level provides a water seal pressure at the water seal downpipe outlet, such that anode exhaust is output through the vent when the first pressure differential is greater than the water seal pressure.

Another aspect of the fuel cell system relates to an anode exhaust line configured to receive the anode exhaust from the anode, a pressure relief line extending from the anode exhaust line, and a pressure relief valve disposed on the pressure relief line and configured to vent anode exhaust.

Another aspect of the fuel cell system relates to a heat sink disposed about the pressure relief line upstream from the pressure relief valve, the heat sink configured to absorb heat from the anode exhaust.

DETAILED DESCRIPTION

Referring to the FIGURES generally, a fuel cell system is shown according to various exemplary embodiments. The fuel cell system includes a fuel cell and an anode exhaust processing system for processing or converting anode exhaust output by the fuel cell for use in other parts of a fuel cell system or for export. The fuel cell system includes an anode blower configured to maintain the fuel cell anode pressure to be very similar to the fuel cell cathode pressure by means of an anode blower speed controller. The anode blower speed controller measures the difference between the anode pressure and the cathode pressure and adjusts the blower speed to maintain the desired pressure differential. A variety of events may cause the pressure differential to be out of specification despite this pressure control, such as a sudden decrease or increase in fuel cell power output, anode blower failure, or upset in the anode exhaust processing equipment, which may result in damage to the fuel cell. Accordingly, the fuel cell system may include fuel cell pressure protection systems configured to minimize or eliminate pressure imbalances between the fuel cell anode and the fuel cell cathode, as will be described in more detail below.

The fuel cell system includes an anode blower (e.g., booster blower, compressor, etc.), which is configured to provide pressure balance in the fuel cell between the anode and the cathode. Specifically, the anode blower offsets the added pressure drop of the anode exhaust processing system and/or pushes the processed anode exhaust to a higher-pressure region for further processing or use in a higher-pressure fuel cell. For example, in a high-efficiency fuel cell system (e.g., a fuel cell system with a Direct Fuel Cell ("DFC")), the anode exhaust from a first (e.g., topping) fuel cell is cooled to condense and remove a significant amount of water from the anode exhaust stream. Then the processed anode exhaust is fed to an anode blower to force the stream into a second (e.g., bottoming) fuel cell, operating at a higher pressure than the first fuel cell. An anode blower may also be required in a fuel cell system for carbon capture (e.g., harvesting carbon dioxide from anode exhaust) or hydrogen capture (e.g., harvesting hydrogen from anode exhaust), to overcome the pressure drop from anode exhaust gas processing specific to the system, and to send the anode exhaust to higher-pressure sub-systems.

Figure 1:
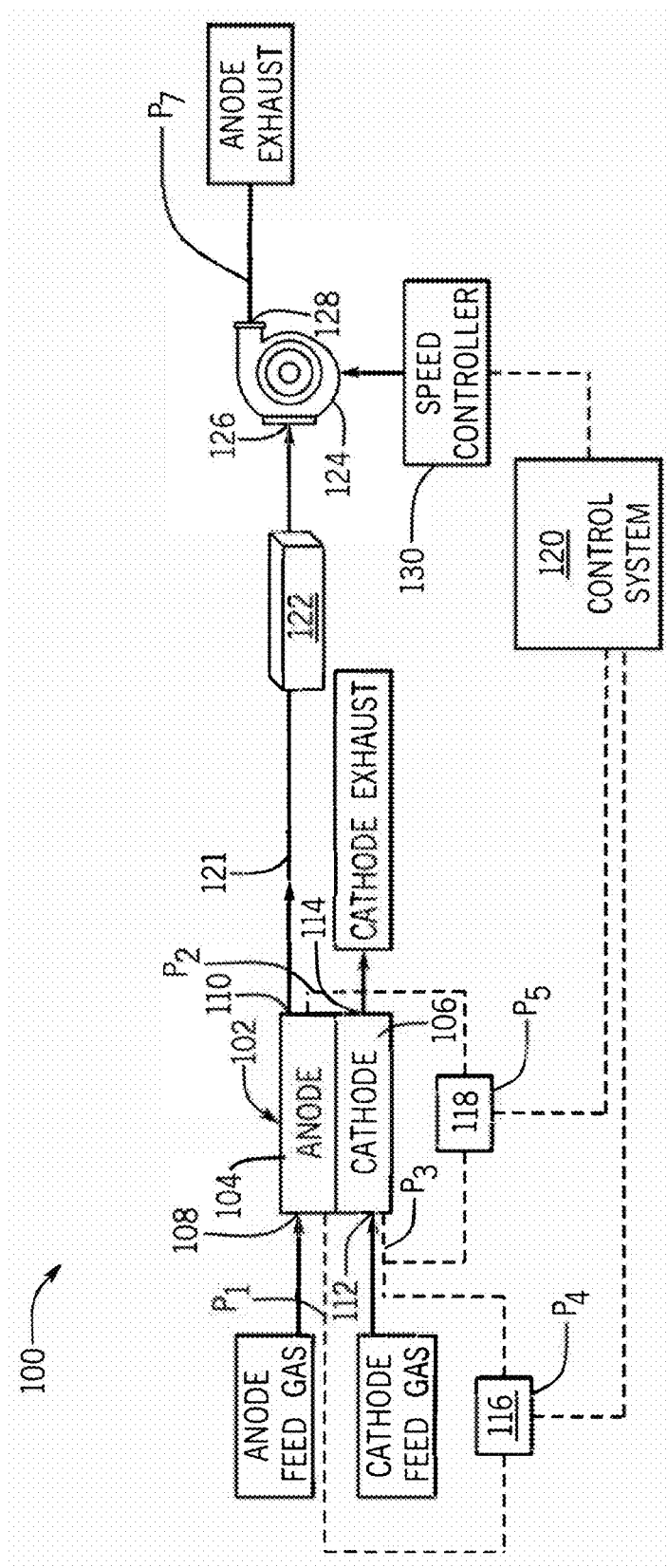
FIG. 1 is a schematic view of a fuel cell system with the anode-to-cathode pressure differential controlled by the speed of an anode booster blower, without an anode under-pressure protection system or anode over-pressure protection system.

Referring now to FIG. 1, a fuel cell system 100 is shown in a baseline configuration, with no specific embodiments, with the pressure at the fuel cell anode inlet 108 or fuel cell anode exit 110 controlled to be similar to the pressure at the cathode inlet 112 by anode blower 124. The fuel cell system 100 includes a fuel cell 102 having an anode 104 and a cathode 106. The anode 104 includes an anode inlet 108, configured to receive anode feed gas, and an anode outlet 110, configured to output anode exhaust. An anode inlet pressure $P_1$ may be defined as the pressure of the anode feed gas at the anode inlet 108 (e.g., at an anode inlet manifold coupled to the anode inlet 108 for receiving the anode feed gas). An anode outlet pressure $P_2$ may be defined as the pressure of the anode exhaust at the anode outlet 110 (e.g., at an anode outlet manifold coupled to the anode outlet 110 for receiving the anode exhaust).

The cathode 106 includes a cathode inlet 112, configured to receive cathode feed gas, and a cathode outlet 114, configured to output cathode exhaust. A cathode inlet pressure $P_3$ may be defined as the pressure of the cathode feed gas at the cathode inlet 112 (e.g., at a cathode inlet manifold coupled to the cathode inlet 112 for receiving the cathode feed gas). The cathode inlet pressure $P_3$ may also be defined as the pressure of a vessel housing the fuel cell 102, for example, when the fuel cell 102 is sealed within the vessel and cathode feed gas is supplied to the vessel for introduction to the cathode 106. In this configuration, the vessel may operate as the cathode manifold.

A first pressure differential transmitter 116 measures a first pressure differential $P_4$ between the anode inlet pressure $P_1$ and the cathode inlet pressure $P_3$. Similarly, a second pressure differential transmitter 118 measures a second pressure differential $P_5$ between the anode outlet pressure $P_2$ and the cathode inlet pressure $P_3$. The first and/or second pressure differential transmitters 116, 118 communicate either wired or wirelessly with a control system 120 (e.g., a computer), which receives the measurements of the first and/or second pressure differentials $P_4$, $P_5$, and controls various aspects of the fuel cell system 100 to control the pressure differential between the anode 104 and the cathode 106. Specifically, the baseline fuel cell system with no embodiments for pressure protection controls the anode pressure to be similar to the cathode pressure by modulation of the blower speed in response to the measured differential pressure at 116 or 118. For example, if the anode pressure is low compared to the cathode pressure, then differential pressure $P_4$ or $P_5$ will be lower than desired, and the anode blower speed controller 130 will be commanded by control system 120 to reduce speed. Conversely, if the anode pressure is high compared to the cathode pressure then differential pressure $P_4$ or $P_5$ will be greater than desired and the anode blower speed controller 130 is commanded by control system 120 to increase speed. While the present application describes controlling the fuel cell system 100 based on the first pressure differential $P_4$, it should be understood that the same structure and methods may be applied to control the second pressure differential $P_5$. For example, various fuel cell systems may measure and control portions of the fuel cell system 100 based on one or both of the first pressure differential $P_4$ and/or the second pressure differential $P_5$.

After anode exhaust is output from the anode 104, it is fed through the anode outlet manifold 110 to an anode exhaust line 121 (e.g., conduit) to a processing system 122 configured to process the anode exhaust by reacting or isolating certain components (e.g., byproducts) in the anode exhaust. For example, the processing system 122 may react carbon monoxide and water vapor in the anode exhaust to form additional hydrogen, and the processing system 122 may isolate and separately output at least one of water, carbon dioxide, or hydrogen from the anode exhaust, while at the same time cooling the anode exhaust. The processing system 122 then outputs a processed anode exhaust (i.e., a processed stream).

The fuel cell system 100 further includes an anode blower 124 having a blower inlet 126 and a blower outlet 128. The anode blower 124 is configured to receive the processed stream at the blower inlet 126. The anode blower 124 compresses the processed stream, increasing the pressure of the processed stream output from the blower outlet 128 (i.e., higher-pressure anode exhaust). A blower inlet pressure $P_6$ may be defined as the pressure of the processed stream at the blower inlet 126 and a blower outlet pressure $P_7$ may be defined as the pressure of the processed stream at the blower outlet 128. After passing the processed stream through the anode blower 124 while it is operating, the blower outlet pressure $P_7$ is higher than the blower inlet pressure $P_6$. The processed stream is then output from the fuel cell system 100 for further processing, collection, or export from the fuel cell system.

A speed controller 130 controls the speed of the anode blower 124 and is connected to the control system 120, such that the anode blower 124 may be controlled based on measurements taken at the first and/or second pressure differential transmitters 116, 118.

Back Pressure Control System

Figure 2:
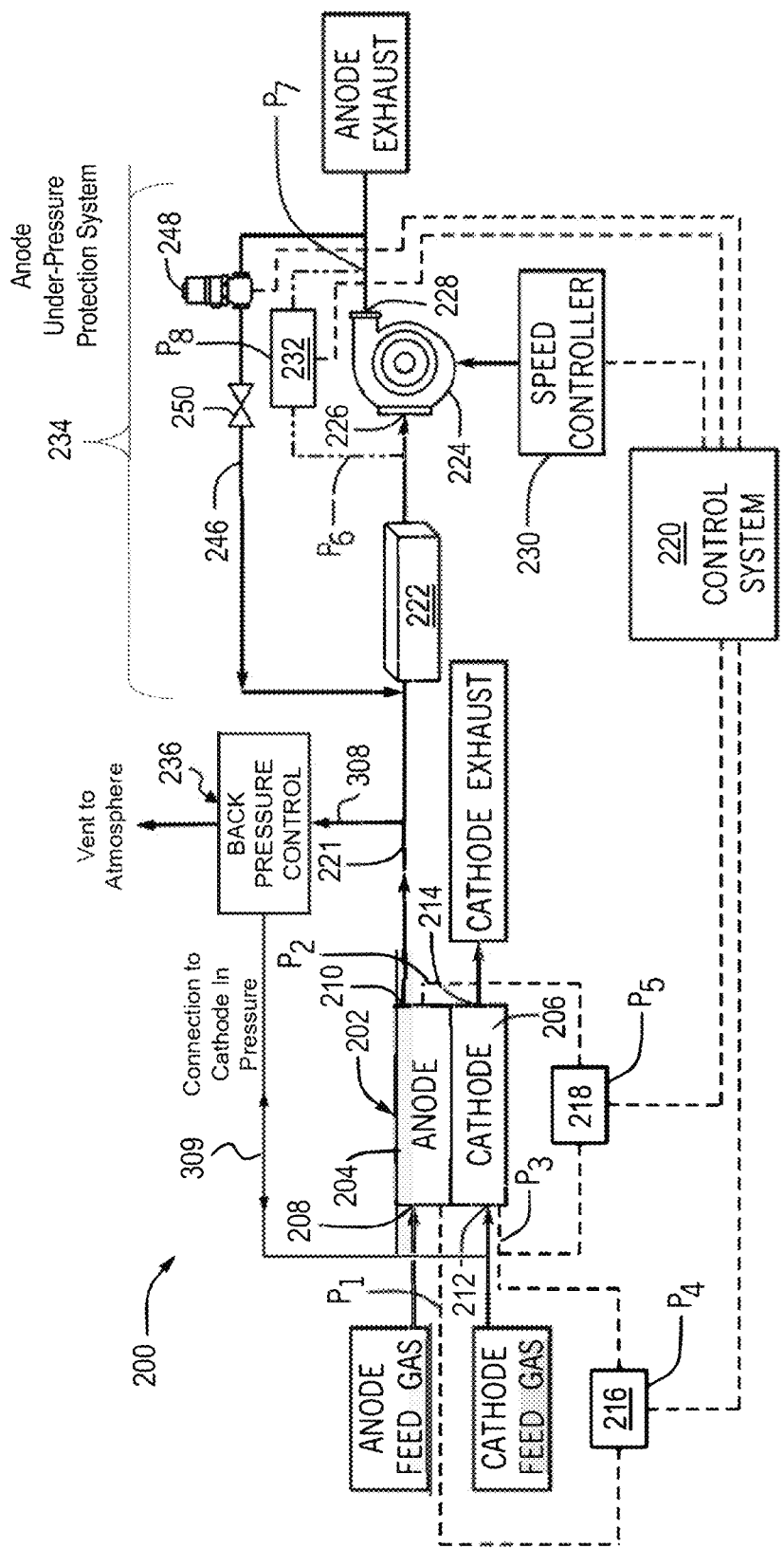
FIG. 2 is a schematic view of a fuel cell system like that shown in FIG. 1, with pressure protection systems added to avoid both anode under-pressurization and anode over-pressurization, according to the exemplary embodiments.

Referring now to FIG. 2, according to another embodiment, the fuel cell system 200 includes at least one anode under-pressure protection system 234 and at least one anode over-pressure protection system (or back pressure control system) 236. The anode under-pressure protection system 234 is configured to prevent excessive anode under-pressure surges in the fuel cell 202, for example as may be caused by sudden decreases in the anode outlet volumetric flow rate that are not immediately met by changes in speed of the anode blower 224.

Referring still to FIG. 2, the anode under-pressure protection system 234 includes a blower recycle line 246. The blower recycle line 246 fluidly connects a portion of the fuel cell system 200 downstream from the blower outlet 228 to a portion of the fuel cell system 200 upstream from the blower inlet 226 (e.g., between the fuel cell anode outlet 210 and the blower inlet 226). The blower recycle line 246 is configured to pass at least a portion of the higher-pressure processed stream from the blower outlet 228 back to the lower-pressure stream at the blower inlet 226, thereby increasing the pressure at the anode outlet manifold 210 to reduce or eliminate anode under-pressurization. While FIG. 2 shows the blower recycle line 246 connects to a portion of the fuel cell system 200 between the anode outlet 210 and the processing system 222 in the fuel cell anode exhaust line 221, according to other exemplary embodiments, the blower recycle line 246 may connect to a portion of the fuel cell system 200 downstream from the processing system 222 or any intermediate point within the processing system 222.

The blower recycle line 246 includes a first valve 248 and a second valve 250 connected along the blower recycle line 246 in series. The first valve 248 is an automated valve connected to the control system 220, and remains in a closed position until it receives a command to open. When the fuel cell system 200 has anode under-pressurization, at least one of the first or second pressure differential transmitters 216, 218 signal to the control system 220 that the fuel cell system 200 is in an anode under-pressurization condition. The control system 220 then sends a signal to the first valve 248 to open, at which point the first valve 248 moves from a closed position to an opened position. According to an exemplary embodiment, the first valve 248 may be configured to open within approximately 200 milliseconds from receiving the signal from the control system 220. According to another exemplary embodiment, the first valve 248 may be configured to open within approximately 200 milliseconds from the first detection of an anode under-pressurization condition in the fuel cell system 200 has occurred. For example, the valve 248 may open upon sensing at least one of the first or second pressure differentials $P_4$, $P_5$ is approximately −2 iwc. When the first valve 248 is opened, the higher-pressure anode exhaust passes from the blower outlet 228, through the blower recycle line 246, to the fuel cell anode exhaust line 221. The first valve 248 may also be configured to open upon the fuel cell system 200 sensing a loss of electrical load in the fuel cell 202 or loss of power to the first valve 248. The first valve 248 may also be configured to open upon a signal from the control system to command the fuel cell to drop all electrical load or a certain percentage of electrical load.

The second valve 250 is a pressure control valve, which is configured to restrict the flow of the processed stream passing through the blower recycle line 246 and received at the anode exhaust line 221 such that the impact of opening the first valve 248 on the anode under-pressurization can be controlled by presetting the opening of the second valve 250 according to the fuel cell system 200 operating condition (e.g., at a pre-determined opening). For example, when the first valve 248 opens, the higher-pressure processed stream is recycled through the blower recycle line 246 to a position upstream from the blower 224, which may lead to over-pressurization (e.g., backpressure) on the fuel cell 202. The second valve 250 controls the volume flow rate in the blower recycle line 246 in order to limit over-pressurization on the fuel cell 202 upon opening of the first valve 248. According to an exemplary embodiment, the second valve 250 may be a pre-set manual hand valve, an orifice, an automated valve configured to change its position (e.g., percentage opened or closed) based on the power output of the fuel cell 202, or other suitable valves. Although FIG. 2 shows the second valve 250 disposed downstream from the first valve 248, according to another exemplary embodiment, the second valve 250 may be disposed upstream from the first valve 248.

A third pressure differential transmitter 232 measures a third pressure differential $P_8$ between the blower outlet pressure $P_7$ and the blower inlet pressure $P_6$. Like the first and second pressure differential transmitters (216, 218) the third pressure differential transmitter 232 communicates either wired or wirelessly with the control system 220. When the first valve 248 is opened and the higher-pressure processed stream output from the blower outlet 228 is recycled back to the lower-pressure anode exhaust line 221, the anode blower 224 may no longer be able to effectively control the first and/or second pressure differentials $P_4$, $P_5$ between the anode 204 and the cathode 206. For this reason, in some configurations, when the first valve 248 is opened the blower speed may only be modulated down (i.e., decelerated) or stopped, and may not be modulated up (i.e., accelerated). This deceleration of the anode blower 224 may be measured by measuring a drop in the third pressure differential $P_8$. The magnitude of $P_8$ may be used to determine when it is safe to close the first valve 248, i.e., the magnitude of $P_8$ determines the impact of the closure of first valve 248.

After opening the first valve 248 to avoid anode under-pressurization, the first valve 248 must be closed again so that the anode blower 224 may resume normal control of the first and/or second pressure differentials $P_4$, $P_5$. Re-closure of the first valve 248 may occur while the fuel cell 202 is still under load, or after the fuel cell 202 has shed all of its load and is in an idle state ready to resume loaded operation. The control system 220 may close the first valve 248 when various requirements are met. A first requirement may include keeping the first valve 248 open for a pre-determined minimum amount of time (e.g., approximately 2 seconds), long enough to ensure that the event that caused the first valve 248 to open has completed. A second requirement may include the third pressure differential $P_8$ being below a pre-determined threshold (e.g., approximately 15 iwc), such that the fuel cell anode 204 does not become under-pressurized upon re-closure of the first valve 248. A third requirement may include the first pressure differential $P_4$ being above a pre-determined threshold (e.g., greater than −1 iwc, greater than 0 iwc, or greater than +1 iwc, etc.). After the requirements are met and the first valve 248 is closed, the control system 220 may modulate the anode blower speed, to either accelerate the anode blower 224 to reduce the first pressure differential $P_4$, or decelerate the anode blower 224 to increase the first pressure differential $P_4$. Therefore, while the first valve 248 is open, the blower speed may only be decreased by the speed controller, and while closed, the anode blower is under normal controls and the speed may either be increased or decreased. While the above discussion defines pre-determined thresholds relative to the first pressure differential $P_4$, according to other exemplary embodiments, the pre-determined thresholds may be taken relative to the second pressure differential $P_5$.

While FIGS. 1 and 2 show the processing system (122, 222) disposed between the fuel cell (102, 202) and the anode blower (124, 224), according to other exemplary embodiments, the processing system (122, 222) may be disposed downstream from the anode blower (124, 224), such that the anode blower (124, 224) receives anode exhaust directly from the anode (104, 204) rather than processed anode exhaust.

Referring again to FIG. 2, the fuel cell system 200 includes, in addition to the anode under-pressure protection system 234, at least one back pressure control system (i.e., anode over-pressure protection system) 236. The back pressure control system 236 is connected to the cathode inlet at the cathode in pressure ($P_3$) through cathode gas line 309 and receives anode exhaust gas at anode out pressure ($P_2$) through the anode exhaust line 121. The back pressure control system 236 is configured to prevent excessive anode over-pressure in the fuel cell 202, for example as may be caused by sudden increases in the anode outlet volumetric flow rate that are not immediately met by changes in speed of the anode blower 224.

Figure 3:
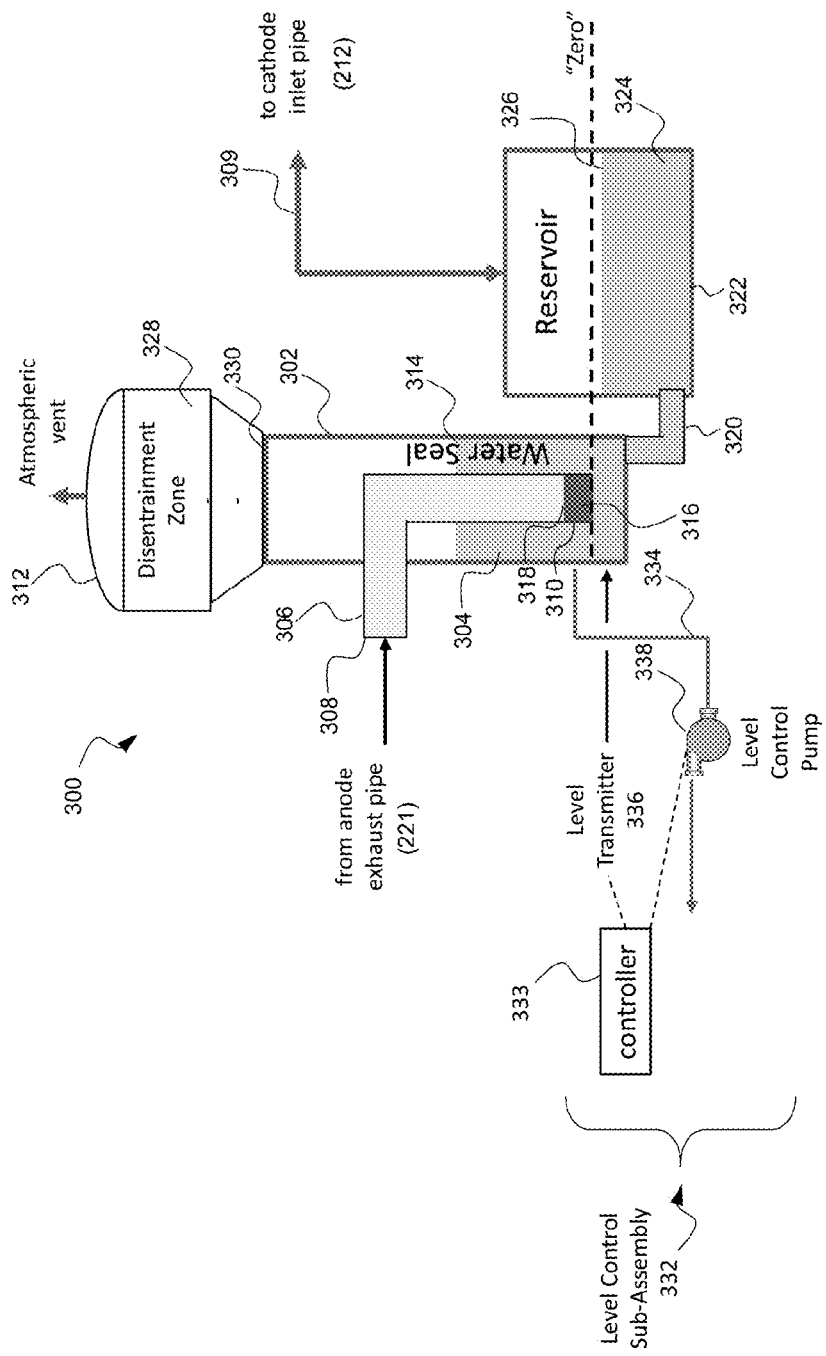
FIG. 3 is a schematic view of one exemplary embodiment of a back pressure control system, including a level-adjusting water seal apparatus for a fuel cell system, configured to receive anode exhaust gas and vent it to atmosphere during upsets in operation of a fuel cell system to avoid anode over-pressurization, according to an exemplary embodiment.

Referring now to FIG. 3, an exemplary embodiment of a back pressure control system for a fuel cell system includes a level-adjusting water seal apparatus (i.e., water seal) 300, which limits a first system pressure (e.g., a fuel cell anode outlet pressure, $P_{andode}$) and has its water level adjusted by a second system pressure (e.g., a fuel cell cathode inlet pressure, $P_{cathode}$) having a known relationship ($P_{anode} - P_{cathode} = P_{diff}$) with the first system pressure. $P_{anode}$ and $P_{cathode}$ may be equal to the anode out pressure $P_2$ and cathode in pressure $P_3$, respectively. One advantage of such a configuration is that the water seal apparatus 300 may provide a fast-acting passive control of the water level in the water seal to provide over-pressure protection at all times and across all operating modes of the fuel cell system, including in normal operation and shut down modes, as well as during operational transients, such as large changes in load or rapid shut down, when the system pressures are also changing, sometimes rapidly.

Referring still to FIG. 3, the water seal 300 includes a water seal tank 302 containing water 304 and a water seal downpipe 306. Water seal downpipe 306 has a water seal downpipe inlet 308, connected to the anode exhaust line (e.g., 221 of FIG. 2) and therefore sensing a first system pressure (e.g., the fuel cell anode outlet pressure, $P_2$), and a water seal downpipe outlet 310 submerged under the water 304 in the water seal tank 302. The water seal tank 302 vents to atmosphere through an atmospheric vent 312. Therefore, the pressure over the water seal tank 302 is atmospheric pressure.

The water seal tank 302 is fluidly connected by a water line 320 to a reservoir tank 322, which is connected to a second system pressure (e.g., the fuel cell cathode pressure $P_3$) by line 309, which connects to the cathode inlet line 212 of FIG. 2. The level-adjusting water seal 300 operates with a fixed volume of water interspersed between the reservoir tank 322 and the water seal tank 302, and the water is pushed back and forth to rapidly adjust the water level 314 in the water seal tank 302 to always maintain the proper over-pressure burst protection of the anode exhaust line 221. As the second system pressure (e.g., $P_{cathode}$) increases or decreases, the water seal level 314 adjusts because the reservoir water 324 is forced to and from the water seal tank 302 from the reservoir tank 322 through the water line 320.

The reservoir tank 322 is larger in diameter, and therefore has a greater cross-sectional area, than the water seal tank 302 (less the cross-sectional area of the water seal downpipe 306), such that changes in second system pressure primarily affect the water level in the water seal tank 302. The ratio of the fluid cross-sectional areas is selected to predictably alter the water seal level 314 as the cathode pressure changes. As cathode pressure increases, the water seal level 314 increases as much as the reservoir tank level 326 decreases, multiplied by the ratio of the cross-sectional areas. For example, if the reservoir tank 322 cross-sectional area is 5 times that of water seal tank 302 (less water seal downpipe 306), then the water seal level 314 will increase 5 inches for every 1-inch decrease in reservoir tank level 326. Because the water seal tank 302 is vented to atmosphere, the water height difference between one tank and the other is always equal to the cathode pressure, as sensed through line 309, which is connected to the fuel cell cathode inlet line 212 (FIG. 2). Although the ratio of cross-sectional areas need not be limited to any particular range, it is often advantageous to have the ratio of cross-sectional areas between the reservoir 322 and the water seal tank 302 (less water seal downpipe 306) equal to about 3 to 6, to control the impact of water level changes in the water seal 314 at various operating conditions. Table 1 shows how the water seal 300 maintains a protective level of water in the water seal tank 302 across the full range of fuel cell operations. In this respect, the water seal 300 acts as a differential pressure vent.

TABLE 1

Water and Protection Levels in Level-Adjusting Water Seal When Reservoir Tank/WS Tank Cross-Sectional Area Ratio Equals 3.21

| Case | Cathode Inlet Pressure @ FIG. 2 line 112 (iwc) | Anode Exhaust Manifold Pressure Set Point (iwc) | Measured Pressue at FIG. 2 Line 121 (iwc) | WS Tank Level (iwc) | Overburst Protect (iwc) | Reservoir Tank Level (iwc) |
|---|---|---|---|---|---|---|
| Shut Down | 0 | 0 | 0 | 6.5 | 6.5 | 6.5 |
| HSBY Set Case | 21.2 | 20.7 | 20.6 | 22.7 | 2.1 | 1.5 |
| Half Load | 15.4 | 14.9 | 13.7 | 18.3 | 4.6 | 2.9 |
| Full Load | 27.6 | 27.1 | 21.7 | 27.6 | 5.9 | 0.0 |

Referring still to FIG. 3, the water seal 300 may include additional optional features to maintain the volume of water within the water seal 300 within a desired range. The water seal 300 operates with a fixed volume of water which can be rapidly transferred between the reservoir tank 322 and the water seal tank 302. However, water may accumulate in the water seal 300 due to connection to the anode gas through water seal downpipe 306, which has high dew point, causing water to gradually condense in the water seal tank 302. Accordingly, water may occasionally be removed from the water seal tank 302 by means of a level control sub-assembly 332. Level control sub-assembly 332 may include a level transmitter 336 and level control pump 338 controlled by a level controller 333. The level control pump 338 is fluidly connected to the water seal tank 302 through a water pipe 334. Under all operating conditions, the level transmitter 336 receives a set point, based on the cathode inlet pressure $P_{cathode}$ ($P_3$), turning on the level control pump 338 as necessary to prevent the buildup of excess water in the water seal tank 302. The water level control sub-assembly 332 will thereby occasionally remove water that accumulates from condensation of humidity in the process gases, or otherwise reduce the water seal level 314 as necessary to maintain a desired operating condition.

As shown in FIG. 3, the water seal 300 may include additional optional features. For example, a disentrainment zone 328 may be interposed between the top 330 of the water seal tank 302 and the atmospheric vent 312. The disentrainment zone 328 has a larger cross-sectional area than the water seal tank 302 to permit venting of high anode exhaust flow rates without entraining water. The disentrainment zone 328 thereby allows the water seal apparatus 300 to protect the fuel cell system over a wider range of operational upsets.

Figure 4:
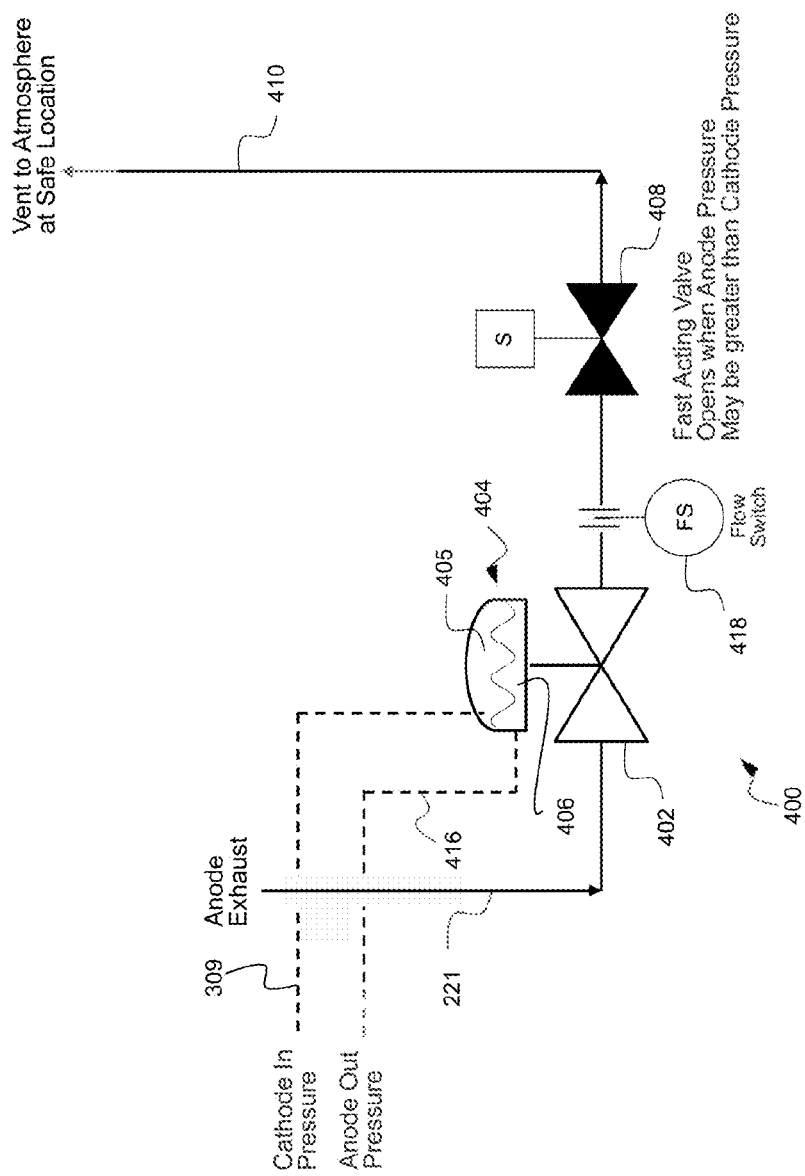
FIG. 4 is a schematic of another embodiment of a back pressure control system, including a differential pressure regulator valve apparatus configured to receive anode exhaust gas and vent it to atmosphere during upsets in operation of a fuel cell system to avoid anode over-pressurization, according to another exemplary embodiment.

Referring now to FIG. 4, another exemplary embodiment of a back pressure control system for a fuel cell system includes a back pressure control valve or differential pressure regulator apparatus 400 that can perform the same function as the water seal 300 (FIG. 3). Differential pressure regulator apparatus 400 includes a control valve 402 and an actuator 404 to maintain the anode-to-cathode differential pressure. In this exemplary embodiment, the differential pressure regulator apparatus 400 is not in series with the blower 224 (FIG. 2). Instead, it vents to the atmosphere through a valve 402. Because the flow rates change very quickly during upsets, the valve 402 must be fast-acting (e.g., preferably operating on the order of 200 milliseconds) to protect the fuel cell. During an emergency shutdown, which may result from a high anode-to-cathode pressure differential, the valve 402 opens, venting anode exhaust gas to the atmosphere through a vent line 410. Because the cathode inlet pressure and the anode pressure are very similar during normal operation, there is potential for valve 402 to leak to the atmosphere, depending on the valve type. To prevent this potential leakage, during normal operation, a fast-acting valve 408 may be added to prevent anode exhaust gas from venting to the atmosphere. Valve 408 would open quickly during any shutdowns, including a shutdown caused by high anode pressure.

Referring still to FIG. 4, control valve 402 and actuator 404 maintain the anode outlet pressure approximately equal to the cathode inlet pressure during upsets. During normal operation, the cathode inlet 212 (FIG. 2) is connected to the cathode sensing line 309, which is connected to a first zone 405 of the valve actuator 404. Meanwhile, anode outlet 210 (FIG. 2) is connected to the anode sensing line 416, which is connected to a second zone 406 of the actuator 404. When $P_3$ ($P_{cathode}$) increases, it exerts pressure on a first side of the diaphragm (not shown) within the actuator 404, thereby closing the valve 402 to reduce anode exhaust gas flow and increase $P_2$ ($P_{anode}$). When $P_3$ ($P_{cathode}$) decreases, the cathode inlet gas exerts less pressure on the first side of the diaphragm (not shown) within the actuator 404, thereby partially or completely opening the control valve 402 to increase the anode exhaust gas flow and decrease $P_2$ ($P_{anode}$). Similarly, when $P_2$ ($P_{anode}$) increases, anode exhaust gas exerts greater pressure on the second side of the diaphragm within the actuator 404, partially or completely opening the control valve 402 and reducing $P_2$ ($P_{anode}$).

As shown in FIG. 4, the differential pressure regulator apparatus 400 may include additional optional features. For example, a flow switch 418 may be included downstream from the control valve 402 to notify the operator if the valve 408 fails. The flow switch 418 is preferably located at the high point in the line, close to the anode exhaust line 221. Preferably, the flow switch 418 is downstream from the control valve 402 to allow easier maintenance on the valve 402.

Figure 5:
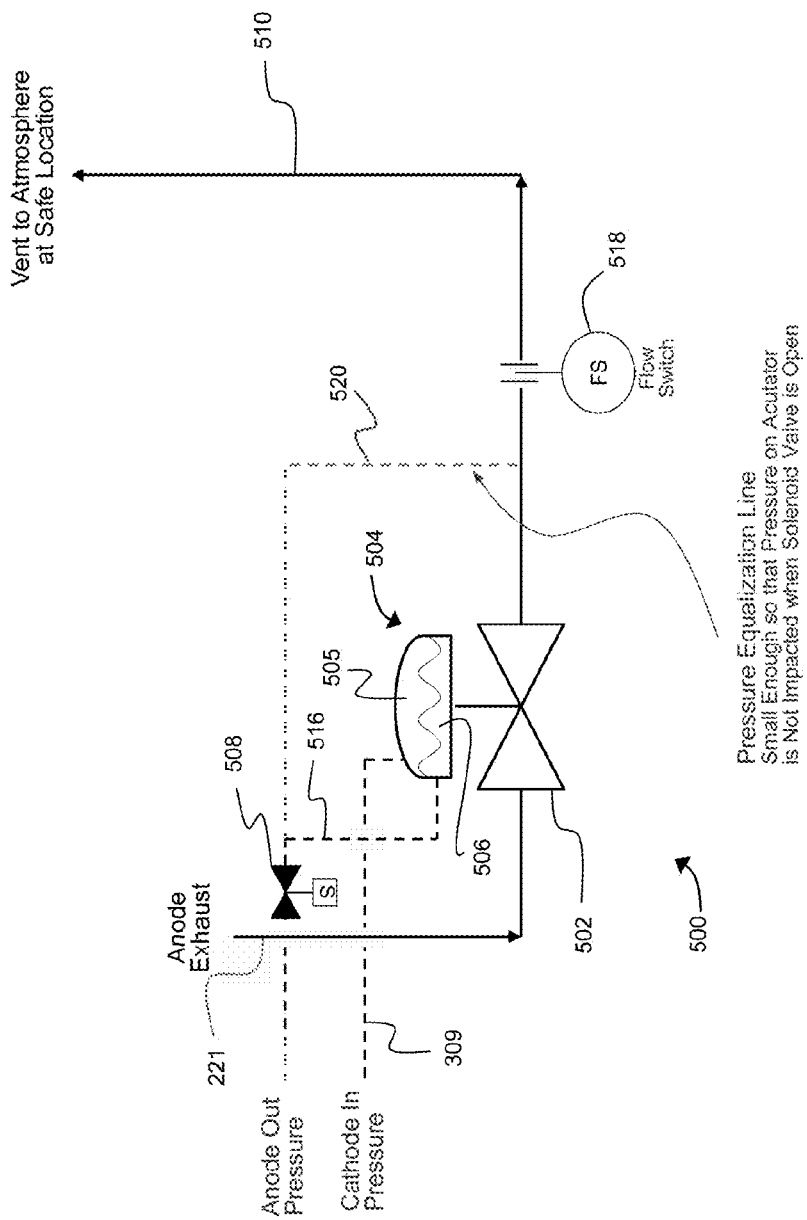
FIG. 5 is a schematic of a variation of the differential pressure regulator valve apparatus shown in FIG. 4, configured to receive anode exhaust gas and vent it to atmosphere during upsets in operation of a fuel cell system to avoid anode over-pressurization, according to a further exemplary embodiment.

Referring now to FIG. 5, because of the low differential pressure desired, there may be the possibility of a leak through the valve 502 during normal operation, especially when a passive control system is used as shown in FIGS. 4 and 5. In this case, a fast-acting valve 508 may optionally be included in the anode pressure line 516 to the back pressure regulator valve 502 with a small vent line or pressure equalization line 520 and open immediately whenever the unit shuts down. This maintains a high pressure differential on the regulator valve 502 during normal operation to prevent leakage.

Referring still to FIG. 5, another exemplary embodiment of the back pressure control system is differential pressure regulator apparatus 500, where the differential pressure regulator apparatus 500 is not in series with a blower 224 (FIG. 2). In this exemplary embodiment, the valve 508 may be located on the anode sensing line 516 between the anode outlet 210 (FIG. 2) and the second zone 506 of the valve actuator 504. A small pressure equalization line 520 from the second zone 506 of the valve actuator 504 is routed downstream of the valve 502. Additionally, the anode sensing line 516 should be sufficiently large relative to the pressure equalization line 520 that anode exhaust gas flow through the pressure equalization line 520 is insufficient to affect the pressure on the actuator 504.

During normal operation, the valve 508 is closed so that the pressure in the second zone 506 of the regulator actuator 504 is zero and the valve 502 is closed due to the pressure of the cathode inlet gas in the first zone 505 of the actuator 504. During an emergency shutdown, the valve 508 opens to the anode sensing line 516 so the pressure exerted within the second zone 506 of the actuator 504 is equal to the anode out pressure, $P_2$. The anode-to-cathode pressure differential is thereby maintained at the desired value. In the event of anode over-pressurization, the anode exhaust gas is vented to the atmosphere through vent line 510.

Referring still to FIG. 5, when valve 508 is open (e.g., during an upset), control valve 502 and actuator 504 maintain the anode outlet pressure approximately equal to the cathode inlet pressure. The cathode inlet 212 (FIG. 2) is connected to the cathode sensing line 309, which is connected to a first zone 505 of the valve actuator 504. Meanwhile, anode outlet 210 (FIG. 2) is connected to the anode sensing line 516, which is connected to a second zone 506 of the actuator 504. When $P_3$ ($P_{cathode}$) increases, it exerts pressure on a first side of the diaphragm (not shown) within the actuator 504, thereby closing the valve 502 to reduce anode exhaust gas flow and increase $P_2$ ($P_{anode}$). When $P_3$ ($P_{cathode}$) decreases, the cathode inlet gas exerts less pressure on the first side of the diaphragm (not shown) within the actuator 504, thereby partially or completely opening the control valve 502 to increase the anode exhaust gas flow and decrease $P_2$ ($P_{anode}$). Similarly, when $P_2$ ($P_{anode}$) increases, anode exhaust gas exerts greater pressure on the second side of the diaphragm within the actuator 504, partially or completely opening the control valve 502 and reducing $P_2$ ($P_{anode}$).

Referring still to FIG. 5, additional optional features may be included in the differential pressure regulator apparatus 500. A small solenoid valve (not shown) may be placed in the pressure equalization line 520 and configured to automatically close during an ESD. A flow switch 518 may also be included downstream from the control valve 502 to notify the operator if the valve 508 fails. The flow switch 518 is preferably located at the high point in the line, close to the anode exhaust line 221. Preferably, the flow switch 518 is downstream from the control valve 502 to allow easier maintenance on the valve 502.

Although FIGS. 4 and 5 show passive back pressure regulator valves 402, 502 where the valve actuator 404, 504 is controlled directly by pressure connections to the cathode inlet and anode outlet, in other embodiments (not shown), the pressure controls may pass through an electronic control system, provided that the electronic control system does not delay the fast action of the valve 402, 502 required during a shutdown.

Pressure Surge Protection System

Figure 6:
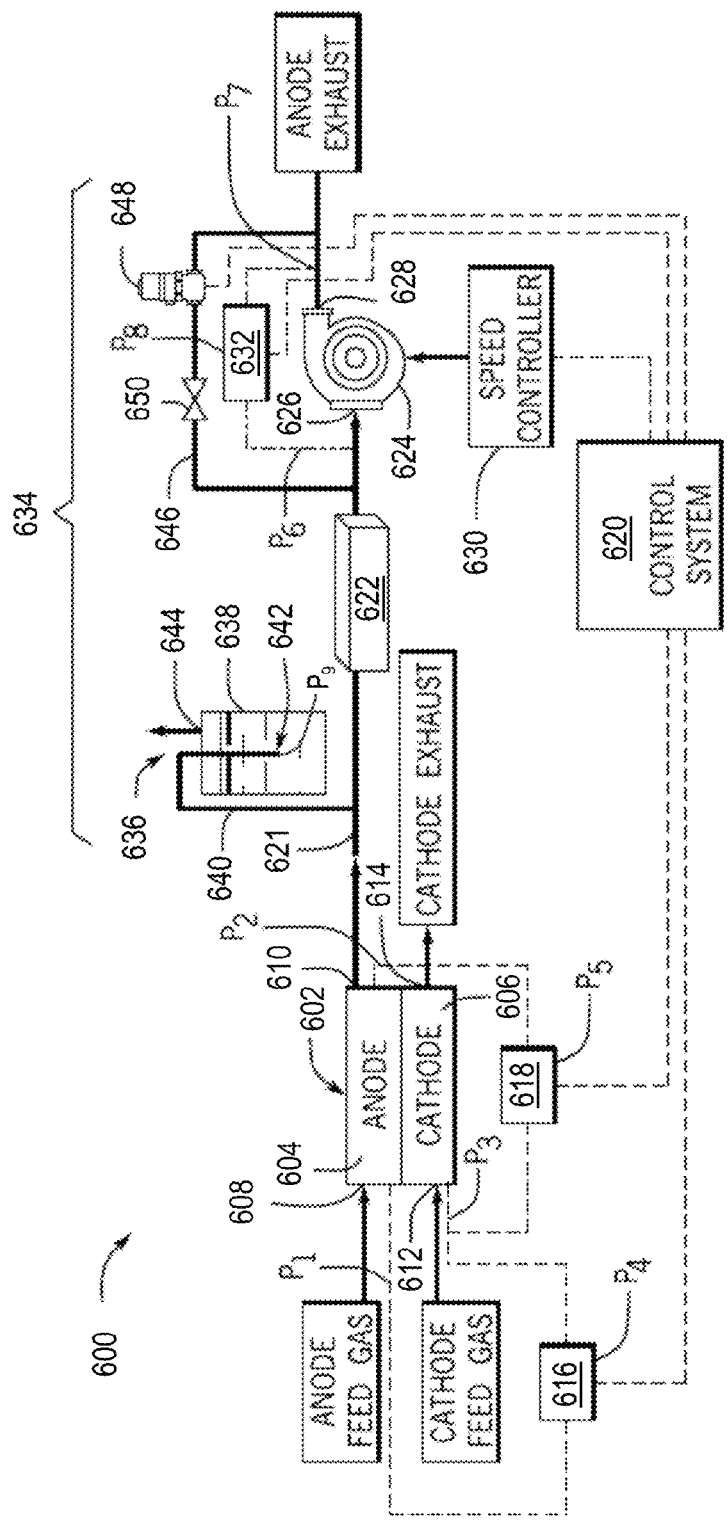
FIG. 6 is a schematic view of a fuel cell system with a pressure surge protection system, according to an exemplary embodiment.

Referring now to FIG. 6, in another embodiment, the fuel cell system 600 includes a pressure surge protection system 634. The pressure surge protection system 634 is configured to prevent excessive pressure surges in the fuel cell 602 caused by sudden changes in the anode outlet volume flow rate that are not immediately met by changes in speed of the anode blower 624. The pressure surge protection system 634 includes a water seal 636 having a vessel 638 (e.g., reservoir) partially filled with water or other suitable liquid. A water seal downpipe 640 (e.g., pipe, line, conduit, etc.) has a starting point that is fluidly connected to the anode exhaust line 621 and defines a water seal downpipe outlet 642 at an opposing end from the anode exhaust line 621. The water seal downpipe 640 extends generally upward from the anode exhaust line 621 and then generally downward into the vessel 638, such that a water seal downpipe outlet 642 is disposed in the water, forming an air lock with a water seal. In this configuration, anode exhaust may vent to the atmosphere or other location through a vent 644 from the anode exhaust line 621, through the water in the vessel 638. The vent 644 may be defined in an upper portion of the vessel 638 and is configured to output anode exhaust from the fuel cell system 600. For example, the vent 638 may output the anode exhaust to the atmosphere or may be fluidly connected to another system configured to capture and store the vented anode exhaust. The vent 644 may also be configured to allow air above the water to maintain an atmospheric pressure, such that the vessel 638 does not increase in pressure as anode exhaust is received therein.

The vessel 638 may be filled with water to a desired water level, which is measured vertically from the water seal downpipe outlet 642. Water may be added to or drained from the vessel 638 to control a water seal pressure $P_9$ measured at the water seal downpipe outlet 642. The water seal pressure $P_9$ varies directly with the water level in the vessel 638. For example, when the water level is 2 inches above the water seal downpipe outlet 642, the water seal pressure $P_9$ is 2 iwc. Anode exhaust will vent from the anode exhaust line 621 when the anode outlet pressure $P_2$ exceeds the water seal pressure $P_9$. In this configuration, the water seal 636 allows for venting anode exhaust in the over-pressurization condition, but prevents mixture of outside gas with the anode exhaust in the anode exhaust line 621. According to an exemplary embodiment, the water level may be set such that over-pressurization is limited to 6 iwc in the anode 604. According to other exemplary embodiments, the water level may be set such that over-pressurization is limited to 10 or 15 iwc.

Referring still to FIG. 6, the pressure surge protection system 634 includes a blower recycle line 646. The blower recycle line 646 fluidly connects a portion of the fuel cell system 600 downstream from the blower outlet 628 to a portion of the fuel cell system 600 upstream from the blower inlet 626 (e.g., between the processing system 622 and the blower inlet 626). The blower recycle line 646 is configured to pass at least a portion of the higher-pressure processed stream from the blower outlet 628 back to the lower-pressure stream at the blower inlet 626, thereby increasing the pressure at the anode outlet manifold 610 to reduce or eliminate anode under-pressurization.

The blower recycle line 646 includes a first valve 648 and a second valve 650 connected along the blower recycle line 646 in series. The first valve 648 is an automated valve connected to the control system 620, and remains in a closed position until it receives a command to open. When the fuel cell system 600 has anode under-pressurization, at least one of the first or second pressure differential transmitters 616, 618 signal to the control system 620 that the fuel cell system 600 is in an anode under-pressurization condition. The control system 620 then sends a signal to the first valve 648 to open at which point the first valve 648 moves from a closed position to an opened position. According to an exemplary embodiment, the first valve 648 may be configured to open within approximately 200 milliseconds from receiving the signal from the control system 620. According to another exemplary embodiment, the first valve 648 may be configured to open within approximately 200 milliseconds from the first detection of an anode under-pressurization condition in the fuel cell system 600 has occurred. For example, the valve 648 may open upon sensing at least one of the first or second pressure differentials $P_4$, $P_5$ is approximately −2 iwc. When the first valve 648 is opened, the higher-pressure anode exhaust passes from the blower outlet 628, through the blower recycle line 646, to the blower inlet 626. The first valve 648 may also be configured to open upon the fuel cell system 600 sensing a loss of electrical load in the fuel cell 602 or loss of power to the first valve 648. The first valve 648 may also be configured to open upon a signal from the control system to command the fuel cell to drop all electrical load or a certain percentage of electrical load.

The second valve 650 is a pressure control valve, which is configured to restrict the flow of the processed stream passing through the blower recycle line 646 and received at the blower inlet 626 such that the impact of opening the first valve 648 on the anode under-pressurization can be controlled by presetting the opening of the second valve 650 (e.g., at a pre-determined pressure). For example, when the first valve 648 opens, the higher-pressure processed stream is recycled through the blower recycle line 646 to a position upstream from the blower 624, which may lead to over-pressurization (e.g., backpressure) on the fuel cell 602 and therefore excessive venting of anode exhaust gas through the water seal vent 644. The second valve 650 controls the volume flow rate in the blower recycle line 646 in order to limit over-pressurization on the fuel cell 602 upon opening of the first valve 648. It should be noted that even if the second valve 650 is in a fully opened position and minor over-pressurization of the fuel cell 602 occurs, the presence of the water seal 636 limits the amount of over-pressurization on the fuel cell 602 to below a threshold that may cause damage. According to an exemplary embodiment, the second valve 650 may be a pre-set manual hand valve, an orifice, an automated valve configured to change its position (e.g., percentage opened or closed) based on the power output of the fuel cell 602, or other suitable valves. While FIG. 6 shows the second valve 650 disposed downstream from the first valve 648, according to another exemplary embodiment, the second valve 650 may be disposed upstream from the first valve 648.

When the first valve 648 is opened and the higher-pressure processed stream output from the blower outlet 628 is recycled back to the lower-pressure blower inlet 626, the anode blower 624 may no longer be able to effectively control the first and/or second pressure differentials $P_4$, $P_5$ between the anode 604 and the cathode 606. For this reason when the first valve 648 is opened, the anode blower 624 is then signaled by the speed controller 630 to modulate speed to control the first and/or second pressure differentials $P_4$, $P_5$. In some configurations, when the first valve 648 is opened, the blower speed may only be modulated down (i.e., decelerated) or stopped, and may not be modulated up (i.e., accelerated). This deceleration of the anode blower 624 may be measured by measuring a drop in the third pressure differential $P_8$. In this configuration, according to some embodiments, as the anode blower 624 slows down, the load (e.g., pressure) on the fuel cell 602 is reduced until there is no longer a load present and/or the anode blower 624 is stationary. In this condition, the fuel cell 602 is in a "hot standby" condition, such that it is configured to generate electricity as soon as the anode blower 624 begins to accelerate.

After opening the first valve 648 to avoid anode under-pressurization, the first valve 648 must be closed again so that the anode blower 624 may resume normal control of the first and/or second pressure differentials $P_4$, $P_5$. Re-closure of the first valve 648 may occur while the fuel cell 602 is still under load, or after the fuel cell 602 has shed all of its load and is in an idle state ready to resume loaded operation. The control system 620 may close the first valve 648 when various requirements are met. A first requirement may include keeping the first valve 648 open for a pre-determined minimum amount of time (e.g., approximately 2 seconds), long enough to ensure that the event that caused the first valve 648 to open has completed. A second requirement may include the third pressure differential $P_8$ being below a pre-determined threshold (e.g., approximately 15 iwc), such that the fuel cell anode 604 does not become under-pressurized upon re-closure of the first valve 648. A third requirement may include the first pressure differential $P_4$ being above a pre-determined threshold (e.g., greater than −1 iwc, greater than 0 iwc, or greater than +1 iwc, etc.). After the requirements are met and the first valve 648 is closed, the control system 620 may modulate the anode blower speed, to either accelerate the anode blower 624 to reduce the first pressure differential $P_4$, or decelerate the anode blower 624 to increase the first pressure differential $P_4$. Therefore, while the first valve 648 is open, the blower speed may only be decreased by the speed controller, and while closed the anode blower is under normal controls and the speed may either be increased or decreased. While the above discussion defines pre-determined thresholds relative to the first pressure differential $P_4$, according to other exemplary embodiments, the pre-determined thresholds may be taken relative to the second pressure differential $P_5$. For example, where the fuel cell 602 has a low pressure drop configuration, the first pressure differential $P_4$ may be substantially similar to the second pressure differential $P_5$.

Figure 7:
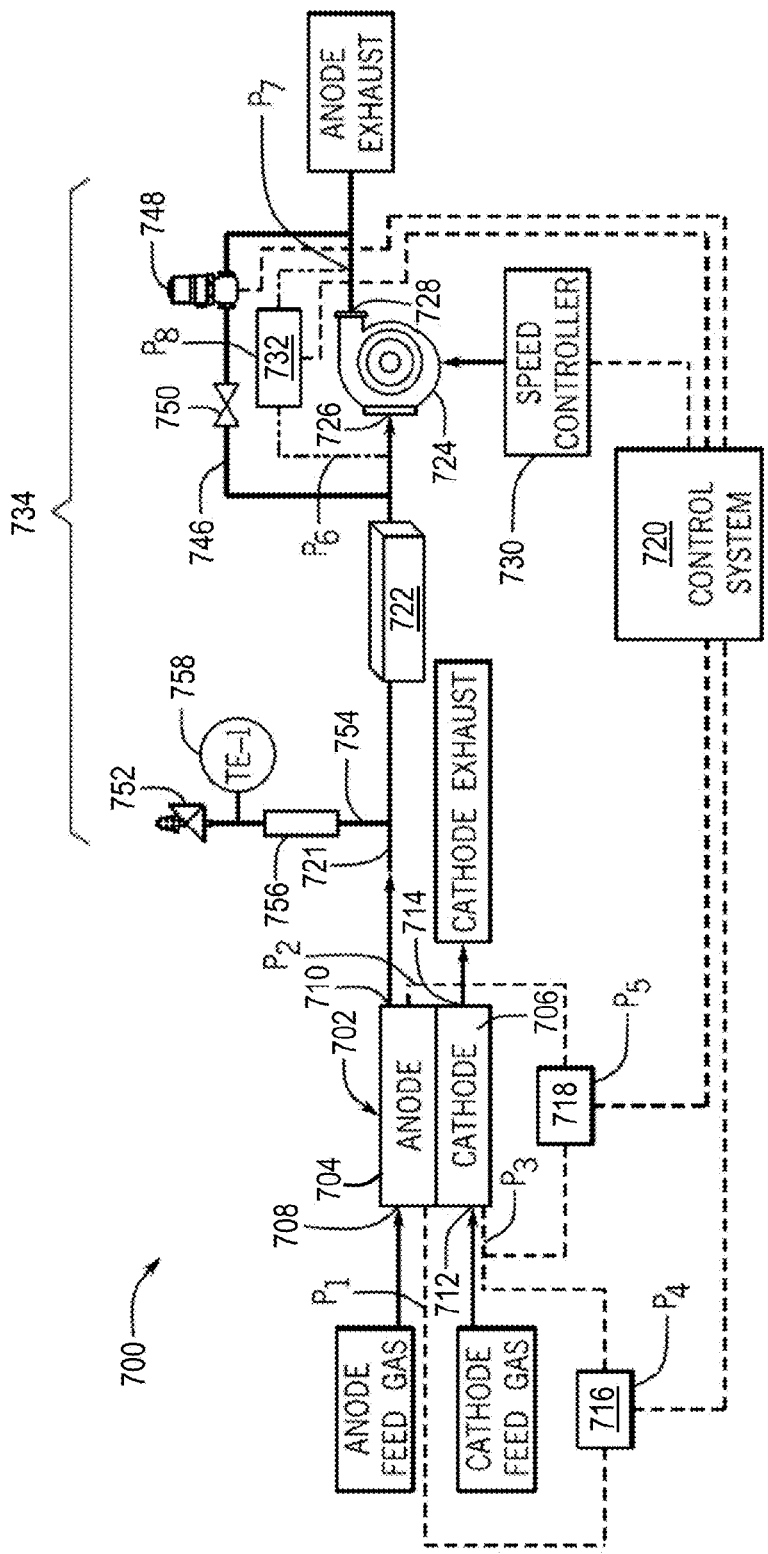
FIG. 7 is a schematic view of a fuel cell system with a pressure surge protection system, according to another exemplary embodiment.

Referring now to FIG. 7, the fuel cell system 700 is shown with a pressure surge protection system 734 according to another exemplary embodiment. In place of or in addition to the water seal (e.g., 636, FIG. 6), the pressure surge protection system 734 includes a pressure relief valve 752 extending from the anode exhaust line 721 through a pressure relief line 754. The pressure relief valve 752 is generally in a closed position and is set to open at a pre-determined pressure, such that when the anode exhaust reaches the pre-determined pressure, the anode exhaust is momentarily output from the fuel cell system 700 substantially the same way as in the water seal 636 (FIG. 6). The pre-determined pressure may be selected to limit damage to the fuel cell 702 due to anode over-pressurization of the fuel cell 702.

Because the pressure relief valve 752 may be sensitive to short durations of high-temperature anode exhaust passing therethrough, heat in the pressure relief valve 752 may be controlled with a heat sink 756 coupled to the pressure relief line 754 upstream from the pressure relief valve 752. The heat sink 756 includes a column packed with metal or other heat absorbing material disposed on the pressure relief line 754, such that heat may be transferred from the anode exhaust to the heat sink 756. The heat sink 756 may be configured (e.g., sized) to absorb enough heat from the anode exhaust, such that the anode exhaust may pass through the pressure relief valve 752 for several seconds (e.g., until over-pressurization of the fuel cell 702 is resolved), without damaging the pressure relief valve 752. The heat sink 756 then transfers heat to the environment until it reaches equilibrium (e.g., ambient temperature).

A temperature sensor 758 may be disposed on the pressure relief line 754 between the heat sink 756 and the pressure relief valve 752. The temperature sensor 758 measures the temperature of the anode exhaust gas received at the pressure relief valve 752 and transmits the temperature to the control system 720. If the temperature measured at the temperature sensor 758 is too high (e.g., above a threshold temperature) for a prolonged period of time, such that the anode exhaust is likely to damage the pressure relief valve 752, the control system 720 may shut down the fuel cell 702 in order to reduce or stop the flow of anode exhaust through the pressure relief valve 752.

While FIGS. 6 and 7 show the blower recycle line (646, 746) connects to a portion of the fuel cell system (600, 700) between the processing system (622, 722) and the blower inlet (626, 726), according to other exemplary embodiments, the blower recycle line (646, 746) may connect to a portion of the fuel cell system (600, 700) upstream from the processing system (622, 722) or any intermediate point within the processing system (622, 722).

While FIGS. 6 and 7 show the processing system (622, 722) disposed between the fuel cell (602, 702) and the anode blower (624, 724), according to other exemplary embodiments, the processing system (622, 722) may be disposed downstream from the anode blower (624, 724), such that the anode blower (624, 724) receives anode exhaust directly from the anode (604, 704), rather than processed anode exhaust. According to other exemplary embodiments, the water seal downpipe 640 (FIG. 6) and/or the pressure relief line 754 (FIG. 7) may be disposed either upstream or downstream from the processing system (622, 722), provided that the water seal downpipe 640 and/or the pressure relief line 754 is upstream from the anode blower (624, 724). In this configuration the fuel cell (602, 702) is protected from anode over-pressurization.

Figure 8:
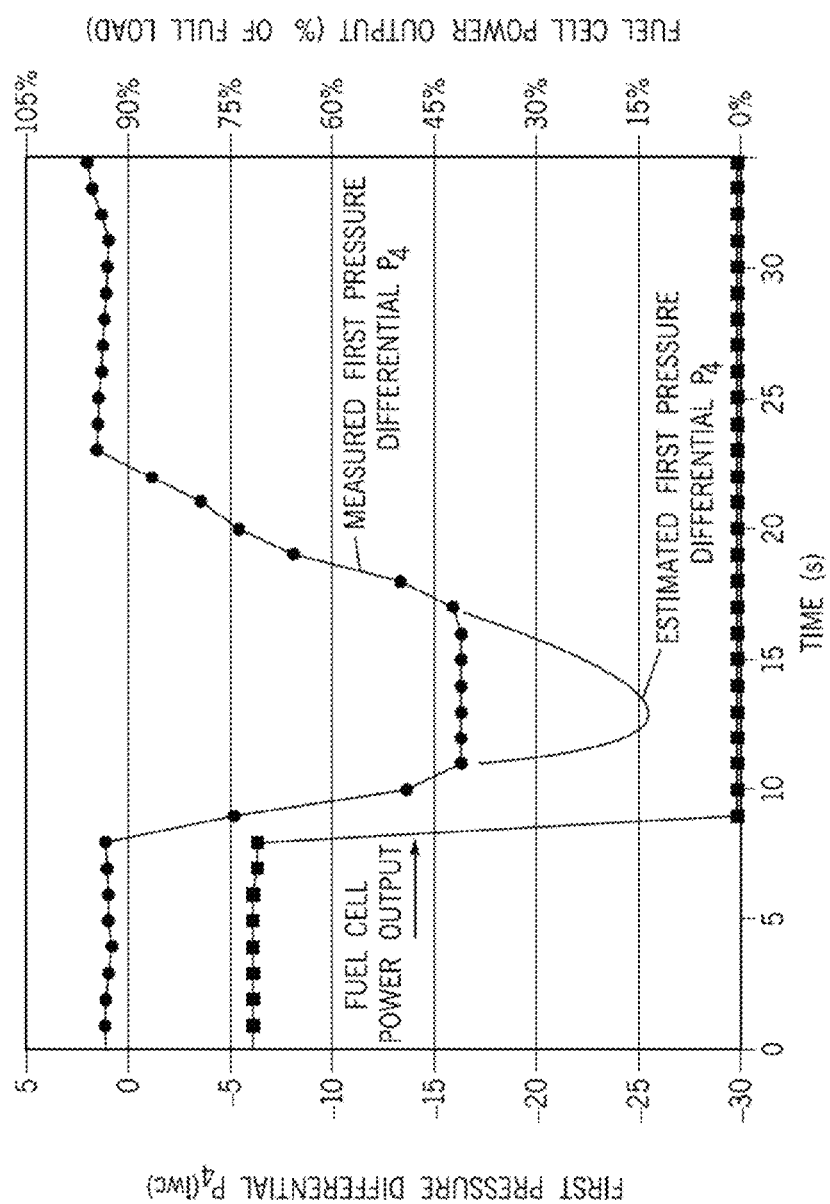
FIG. 8 is a plot showing a pressure surge in a fuel cell system without protection from a pressure surge protection system.

Referring now to FIG. 8, a plot of test results of the first pressure differential $P_4$ and percentage of fuel cell power is shown for a fuel cell system without the pressure surge protection system 634. As provided in FIG. 8, when the fuel cell 602 suddenly drops from approximately 72% of full load capacity to 0% (e.g., the fuel cell instantaneously sheds its load), the first pressure differential $P_4$ drops by approximately 17 iwc within 3 seconds, and stays below −15 iwc for approximately 6 seconds before beginning to recover. It should be noted that FIG. 8 shows a sustained first pressure differential $P_4$ of approximately −16.3 iwc. However, during testing the first pressure differential transmitter 616 could only measure as low as −16.3 iwc. FIG. 8 further shows an estimated curve with peak under-pressurization of approximately −25 iwc, 5 seconds after fuel cell shutdown, based on other operating parameters measured during the test. Based on the results from this test, a sudden reduction from 100% of full load capacity to 0% is expected to change the first pressure differential $P_4$ by approximately −35 iwc, which would very likely cause damage to the fuel cell 602.

Figure 9:
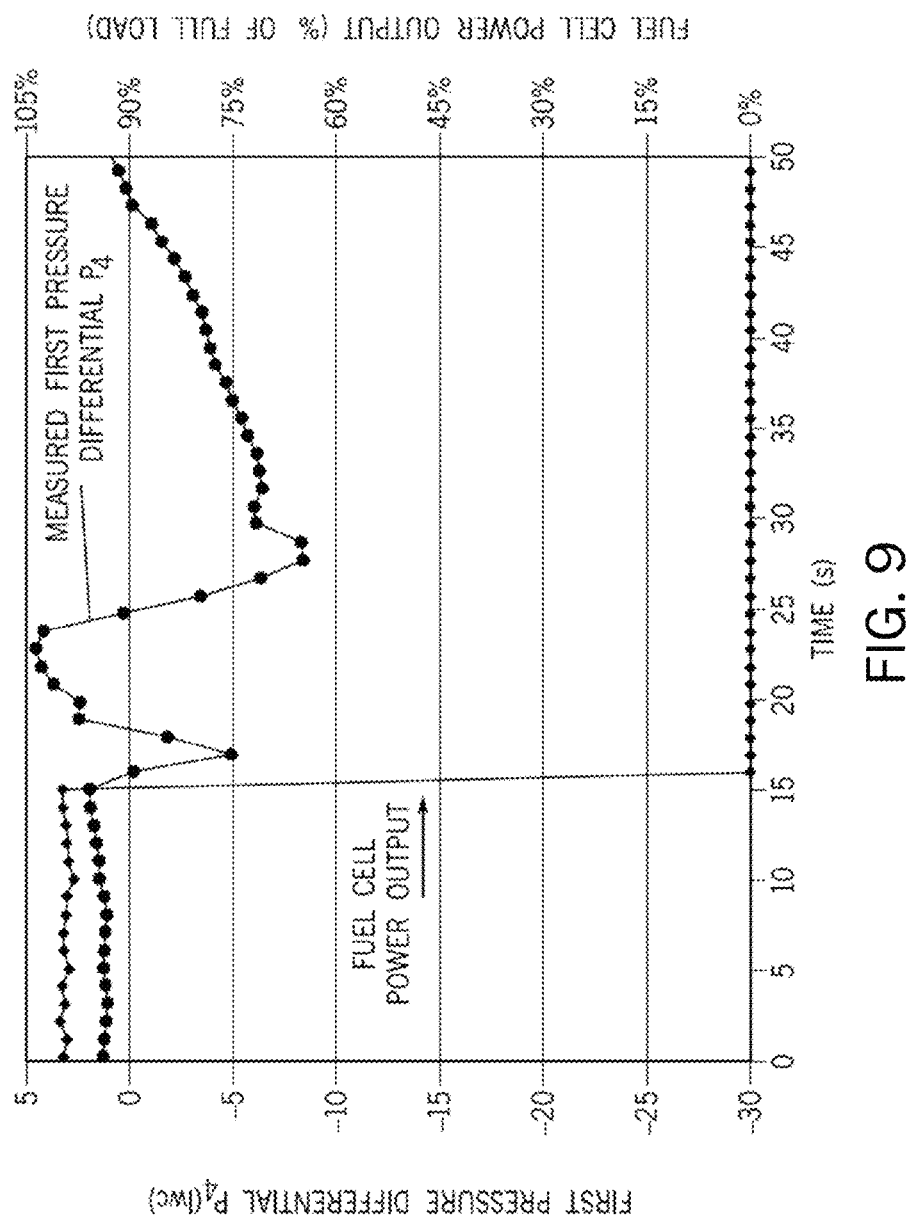
FIG. 9 is a plot showing pressure surge in a fuel cell system with protection from a pressure surge protection system.

Referring now to FIG. 9, a plot of test results of the first pressure differential $P_4$ and percentage of fuel cell power is shown for a fuel cell system with the pressure surge protection system 634 having a configuration as shown in FIG. 6. As provided in FIG. 9, when the fuel cell 602 suddenly drops from 100% of full load capacity to 0%, the first pressure differential $P_4$ drops to −5 iwc by 2 seconds after the drop in the load. As the first pressure differential $P_4$ drops, the controller 620 senses the change in pressure differential and the first valve 648 is opened within approximately 200 milliseconds. The first pressure differential $P_4$ then suddenly rises again. After approximately 8 seconds following the drop in the load on the fuel cell 602, the water seal 636 limits the increase of the first pressure differential $P_4$ to approximately 5 iwc. (While this test was performed with a water seal 636, similar results are expected with the pressure relief valve 752 (e.g., as configured as shown in FIG. 7).) FIG. 9 then shows the first pressure differential $P_4$ dropping to approximately −8 iwc before gradually returning back to approximately 1 iwc, as the first valve 648 is closed and the anode blower 624 resumes control of the first and/or second pressure differential $P_4$, $P_5$ as controlled by the speed controller 630. Unlike the system shown in FIG. 8, while FIG. 9 still has pressure surges, the first pressure differential $P_4$ is substantially limited in magnitude to within a range (e.g., between approximately −8 and +5 iwc). This range is within the range unlikely to cause damage to the fuel cell 602, whereas the fuel cell system without the pressure surge protection system 634 does not fall within such range. It should be recognized that FIG. 9 shows a complete loss of load from the fuel cell 602, which represents the most severe pressure surge condition. Where the fuel cell 602 has a sudden reduction in load, but not all the way to 0%, the magnitude of the pressure surge is expected to be less than shown in FIG. 9.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in dimensions, structures, shapes and proportions of the various elements, values of parameters, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fuel cell system, comprising:
a fuel cell, comprising:
an anode having an anode inlet configured to receive anode feed gas, and an anode outlet configured to output anode exhaust; and
a cathode having a cathode inlet and a cathode outlet;
an anode blower having a blower inlet and a blower outlet, wherein the anode blower is configured to receive the anode exhaust at the blower inlet and output a higher-pressure anode exhaust at the blower outlet;
a blower recycle line configured to receive a portion of the higher-pressure anode exhaust downstream from the anode blower and to output the portion of the higher-pressure anode exhaust upstream from the anode blower;

a first valve disposed in the blower recycle line, the first valve configured to open when the anode of the fuel cell is under-pressurized; and a processing system configured to receive anode exhaust from the fuel cell and to separate at least one of water, carbon dioxide, or hydrogen from the anode exhaust, wherein the processing system is configured to output processed anode exhaust to the anode blower, wherein the blower recycle line is configured to output the portion of the higher-pressure anode exhaust upstream from the processing system and downstream from the anode outlet.

2. The fuel cell system of claim 1, further comprising a second valve disposed in the blower recycle line, wherein the second valve is a pressure control valve configured to restrict an amount of the higher-pressure anode exhaust passing through the blower recycle line.

3. The fuel cell system of claim 1, wherein:
a first pressure differential is defined as a difference between a first pressure that is measured at one of the anode inlet or the anode outlet, and a second pressure measured at the cathode inlet; and
the first valve is an automatic valve configured to open automatically when the first pressure differential drops below a pre-determined threshold amount.

4. The fuel cell system of claim 3, further comprising a first pressure differential transmitter configured to measure and transmit the first pressure differential to a control system, wherein the control system is configured to send a signal to the first valve to open based on the first pressure differential transmitted from the first pressure differential transmitter.

5. The fuel cell system of claim 3, further comprising:
an anode exhaust line configured to receive the anode exhaust from the anode;
a vessel partially filled with water;
a water seal downpipe extending away from the anode exhaust line and with at least a portion extending downward into the vessel, such that a water seal downpipe outlet is disposed in the water; and
a vent defined in the vessel above a waterline, the vent configured to output anode exhaust.

6. The fuel cell system of claim 5, wherein:
a water level in the vessel is defined relative to a vertical position of the water seal downpipe outlet; and
the water level provides a water seal pressure at the water seal downpipe outlet, such that anode exhaust is output through the vent when the first pressure differential is greater than the water seal pressure.

7. The fuel cell system of claim 3, further comprising:
an anode exhaust line configured to receive the anode exhaust from the anode;
a pressure relief line extending from the anode exhaust line; and
a pressure relief valve disposed on the pressure relief line and configured to vent anode exhaust.

8. The fuel cell system of claim 7, further comprising a heat sink disposed about the pressure relief line upstream from the pressure relief valve, the heat sink configured to absorb heat from anode exhaust.

9. The fuel cell system of claim 8, further comprising a temperature sensor disposed between the heat sink and the pressure relief valve, the temperature sensor configured to measure a temperature of anode exhaust passing through the pressure relief valve.

10. The fuel cell system of claim 4, further comprising a water seal comprising:

an anode exhaust line configured to receive anode exhaust from the anode;
a vessel partially filled with water;
a water seal downpipe extending away from the anode exhaust line and with at least a portion extending downward into the vessel, such that a water seal downpipe outlet is disposed in the water;
a reservoir partially filled with water and connected to a cathode inlet pipe such that a pressure over the reservoir is equal to a cathode inlet pressure;
a water pipe connecting the vessel and the reservoir, the water pipe configured to permit water flow from the vessel to the reservoir during increases in an anode exhaust pressure and from the reservoir to the vessel during increases in the cathode inlet pressure; and
a vent defined in the vessel above a waterline, the vent configured to output anode exhaust;
wherein the water seal is configured to limit fuel cell anode pressure by having a water level adjusted by the cathode inlet pressure, thereby protecting the fuel cell system from anode over-pressurization by venting excess anode exhaust gas while maintaining a desired anode pressure during pressure upsets when the anode blower cannot maintain a desired anode-to-cathode pressure differential.

11. The fuel cell system of claim 4, further comprising a differential pressure regulator configured to maintain a pressure at the anode outlet relative to a pressure at the cathode inlet by venting excess anode exhaust gas to atmosphere while maintaining a desired anode pressure during upsets when the anode blower cannot maintain a desired anode-to-cathode pressure differential, thereby protecting the fuel cell against anode over-pressurization.

12. A method of controlling pressure surge in a fuel cell system, comprising:
receiving anode feed gas at an anode inlet;
receiving cathode feed gas at a cathode inlet;
outputting anode exhaust from an anode outlet;
measuring a first pressure at one of the anode inlet or the anode outlet;
measuring a second pressure at the cathode inlet;
determining a first pressure differential between the first pressure and the second pressure;
separating at least one of water, carbon dioxide, or hydrogen from the anode exhaust using a processing system configured to receive the anode exhaust from the anode outlet and configured to output processed anode exhaust to a blower inlet in communication with an anode blower;
receiving the processed anode exhaust at the blower inlet;
outputting higher-pressure anode exhaust from a blower outlet; and
receiving at least a portion of the higher-pressure anode exhaust at a blower recycle line configured to output the portion of the higher-pressure anode exhaust upstream from the processing system and downstream from the anode outlet.

13. The method of claim 12, further comprising:
opening a first valve disposed in the blower recycle line when the first pressure differential drops below a pre-determined pressure;
passing a portion of the higher-pressure anode exhaust through the first valve; and
receiving the portion of the higher-pressure anode exhaust from the blower recycle line at the blower inlet.

14. The method of claim 13, further comprising passing a portion of the higher-pressure anode exhaust through a second valve disposed along the blower recycle line, wherein the second valve is configured to restrict an amount of the portion of the higher-pressure anode exhaust passing therethrough.

15. The method of claim 12, further comprising:
   receiving anode exhaust at a water seal downpipe, the water seal downpipe defining a water seal downpipe outlet disposed in a vessel partially filled with water;
   outputting anode exhaust from the water seal downpipe outlet and into the water when a water seal pressure measured at the water seal downpipe outlet is less than the first pressure differential.

16. The method of claim 15, wherein a pressure at the water seal downpipe outlet is controlled by raising or lowering a water level in the vessel.

17. The method of claim 12, further comprising:
   receiving anode exhaust at a pressure relief line; and
   outputting anode exhaust from the pressure relief line through a pressure relief valve when the first pressure differential is greater than a pre-determined threshold pressure.

18. The method of claim 17, further comprising:
   passing anode exhaust through a heat sink disposed about the pressure relief line upstream from the pressure relief valve; and
   absorbing heat from anode exhaust in the heat sink.

19. The method of claim 18, further comprising reducing a load on a fuel cell when a temperature sensor downstream from the heat sink and upstream from the pressure relief valve measures a temperature above a pre-determined threshold temperature for a time longer than a pre-determined threshold time.

* * * * *